United States Patent [19]

Shulz et al.

[11] 4,107,511

[45] Aug. 15, 1978

[54] CONTROL SYSTEM FOR AN ELECTROLYTIC STEAM GENERATOR

[75] Inventors: Robert J. Shulz, Brookfield; Orest A. Kozinczuk, Chicago, both of Ill.

[73] Assignee: Innovative Patent Trust, Palatine, Ill.

[21] Appl. No.: 629,592

[22] Filed: Nov. 6, 1975

Related U.S. Application Data

[62] Division of Ser. No. 434,506, Jan. 18, 1974, abandoned, which is a division of Ser. No. 253,409, May 15, 1972, Pat. No. 3,818,819.

[51] Int. Cl.$^2$ ............................ H05B 3/60; F22B 1/30
[52] U.S. Cl. .................................... 219/286; 219/273; 219/295
[58] Field of Search ............................ 219/284–295, 219/271–276, 401; 338/80–86

[56] References Cited

U.S. PATENT DOCUMENTS

| 1,665,793 | 4/1928 | Sandborgh | 219/286 |
| 2,486,490 | 11/1949 | McDonald et al. | 219/286 |
| 2,790,890 | 4/1957 | Kasuga | 219/287 |
| 3,083,288 | 3/1963 | Vischer | 219/285 |

FOREIGN PATENT DOCUMENTS

| 1,930,950 | 2/1970 | Fed. Rep. of Germany | 219/287 |
| 396,404 | 8/1933 | United Kingdom | 219/287 |
| 1,139,911 | 1/1969 | United Kingdom | 219/295 |

*Primary Examiner*—A. Bartis
*Attorney, Agent, or Firm*—Edmond T. Patnaude

[57] ABSTRACT

A current relay is connected in series with the electrodes of an electrolytic generator and controls the operation of a time delay relay connected in series with the operating solenoid of a water inlet valve. The time delay relay delays the opening of the water inlet valve for a predetermined time after the electrodes are energized and the current supplied thereto is less than a predetermined value.

3 Claims, 2 Drawing Figures

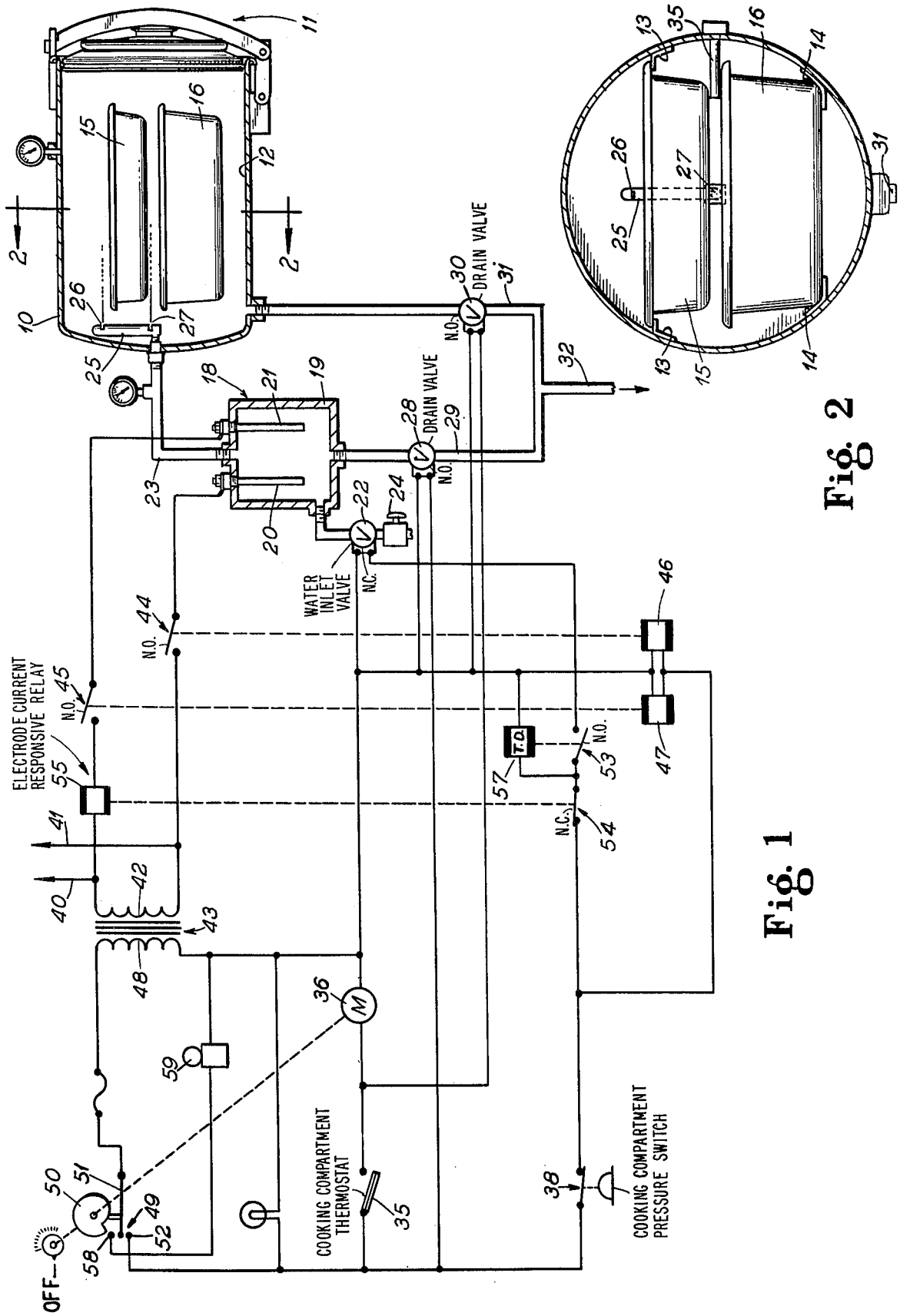

CONTROL SYSTEM FOR AN ELECTROLYTIC STEAM GENERATOR

This is a division of application Ser. No. 434,506 filed Jan. 18, 1974, now abandoned, which is in turn a division of application Ser. No. 253,409 filed May 15, 1972, now U.S. Pat. No. 3,818,819.

The present invention relates in general to electrolytic steam generators and it relates in particular to a new and improved control system which automatically supplies water to said generator while preventing the supply of an excessive amount of water thereto. While the control system finds particular application for use with a steam generator used in a pressure cooking system and is, therefore, described in connection with pressure cooking it will be apparent to those skilled in that art that it has other applications.

SUMMARY OF THE INVENTION

Briefly, an improved electrolytic generator embodying the present invention is provided with a steam compartment having a steam outlet, a water inlet and a plurality of electrodes disposed in the compartment. The novel features of the invention include a current relay having a pickup coil and a set of normally closed contacts operated by said coil, a normally closed water inlet valve means for controlling the supply of water to the water inlet, with the valve means being opened by a solenoid, and time delay relay means having a set of normally open contacts and an operating coil for closing the contacts a predetermined time after the time delay means is energized. The normally closed contacts and the normally open contacts are serially connected with the solenoid across a source of voltage. Control means connect the pickup coil in series with the electrodes across a source of voltage to cause the pickup coil to open the normally closed contacts when the current supplied to the electrodes exceeds a predetermined valve. The opening of the water inlet valve by the solenoid to supply water to the compartment is delayed by the time relay means for a predetermined time following the time when the current supplied to said electrodes falls below a predetermined value.

BRIEF DESCRIPTION OF THE DRAWING

Further objects and advantages and a better understanding of the invention may be had from the following detailed description taken in connection with the accompanying drawing, wherein:

FIG. 1 is a schematic diagram of a preferred embodiment of the pressure cooking system of the present invention, and FIG. 2 is a sectional view taken along the line 2—2 of FIG. 1 showing the disposition of the steam nozzles in the cooking compartment.

DETAILED DESCRIPTION OF THE DRAWING

Referring now to the drawing, a vessel 10 and a pressure tight door assembly 11 define a generally cylindrical cooking compartment 12 including upper and lower pairs of tracks 13 and 14 for slidably supporting a set of pans 15 and 16 for holding the food to be prepared. The door mechanism may be of any suitable type but is preferably like that disclosed in U.S. Pat. No. 3,765,562. and assigned to the same assignee as is the present application. In use the door 11 is swung outwardly of the compartment 12 for inserting and removing the pans.

In order to supply pressurized steam to the cooking compartment 12 there is provided an electroyltic type steam generator 18 including a pressure housing 19 in which a plurality of electrodes 20 and 21 are mounted. Water is supplied to the steam chamber within the housing 19 through a water inlet line including a normally closed solenoid valve 22, and steam is supplied to the cooking compartment through a steam line 23. A manually adjustable flow control valve 24 is provided in the water inlet line to the generator to enable control of the flow of water to the generator in accordance with the conductivity thereof and the characteristics of the generator. For example, in those areas where the water is hard, a high flow rate can be tolerated inasmuch as high current flow therethrough occurs. Hence, as hard water enters the generator, current almost immeciately flows between the electrodes which, as explained hereinafter, is used to close the valve 22 when such current exceeds a predetermined value. On the other hand, where the water is soft is is desirable to employ a lower inlet rate to permit the water to warm up, which increases the conductivity thereof, so that sufficient current flows between the electrodes before the generator is full to enable control of the water inlet valve 22. Once the proper flow rate for the water in a particular locality has been determined, a nonadjustable flow control orifice of the proper size may be substituted for the adjustable valve 24.

The line 23 is coupled through the rear wall of the vessel 10 to a vertically disposed nozzle member 25 having a pair of spray orifices 26 and 27 for directing steam across the tops of the pans 15 and 16. The nozzle member 25 is tubular having a closed upper end, and the orifices 26 and 27 are inwardly opening horizintal slots which respectively direct a flat, fan shaped spray pattern across the top of the associated pan to educt the air from the pans at the beginning of a cooking cycle to promote reapid heat transfer to the food. During the cooking cycle whenever steam is demanded, the flat spray pattern educts the cooled gases from the pans to maintain circulation of the gaseous heating medium around the food without impinging the fresh steam directly onto the food. The fresh steam thus travels a circuitous path through the cooking compartment before being drawn into the pans thus minimizing the condensation of steam in the pans.

A solenoid operated drain valve 28 is connected in a drain line 29 connected to the bottom of the generator 18, and another solenoid operated drain valve 30 is connected in a drain line 31 connected to the bottom of the vessel 10. The drain lines 29 and 31 are connected together downstream of the valves 28 and 30 and connected through a common drain line 32.

In use, food to be prepared is placed in the pans 15 and 16 which are then inserted in the cooking vessel and the door 11 is then sealably closed. As described in greater detail hereinafter, a timer is set to the required cooking period whereupon the water inlet valve 22 opens to supply water to the pressure chamber in the generator and the generator drain valve 28 closes. The generator electrodes 20 and 21 are connected across a voltage source whereby current flows between the electrodes through the water to heat and vaporize it thereby to supply steam to the cooking compartment. When the temperature in the rear of the cooking compartment reaches a temperature of about 220° F, a condition which occurs when frozen food initially placed in the pans has been substantially defrosted, and is sensed by a thermostat 35 mounted therein, the drain valve 30 closes to completely seal the cooking compartment from the atmosphere, and a timer motor 36 is energized to time out the previously set cooking period. During the cooking period the pressure in the compartment is controlled by a pressure responsive switch 38 which deenergizes the electrodes and interrupts the supply of water to the generator by closing the water inlet valve 22 when the compartment pressure exceeds a predetermined value of about fifteen psi. At the end of the cooking cooking period the water inlet valve 22 is closed and the drain valves 28 and 30 are opened to terminate the supply of steam to the cooking compartment, to drain and flush the generator, to drain the water collected in the bottom of the cooking compartment and to exhaust the steam therefrom. The door assembly 11 may then be opened and the pans 15 and 16 removed.

Considering the control circuit in greater detail, a pair of power busses 40 and 41 are connected across the primary winding 42 of a transformer 43. A pair of normally open sets of contacts 44 and 45 on a pair of power relays having solenoids 46 and 47 are respectively connected between the busses 40 and 41 and the generator electrodes 20 and 21. The solenoids 46 and 47 are connected in parallel between one terminal of a secondary winding 48 of the transformer 43 and to the other terminal thereof through the normally closed contacts of the pressure switch 38 and a single pole double throw switch 49 operated through a cam 50 by the time motor 36. When the timer is in the off position as shown, the switch arm 51 is in an intermediate, nonswitching position. When, however, the timer is set to a timing position, the switch arm makes contact with the lower contact 52 to energize the solenoids 46 and 47 to close the contacts 44 and 45 and thus energize the generator electrodes 20 and 21. In addition, the solenoid of the drain valve 28 is energized to close the valve 28.

The solenoid of the water inlet valve 22 is connected at one end to the lower terminal of the transformer secondary winding 48 and is connected at the other end to the timer switch contact 52 through a set of normally open contacts 53 of a two second time delay relay 57, a set of normally closed contacts 54 of a current relay having a coil 55 serially connected with the generator electrode 21, and the normally closed contacts of the pressure switch 38. The coil of the time delay relay 57 is serially connected with the pressure switch contacts 38 and the current relay contacts 54 through the timer switch across the transformer winding 48 and picks up two seconds after being energized thereby to open the water inlet valve 22. During a cooking cycle whenever the current relay contacts 54 open due to an excessive current flow through the electrodes, the valve 22 closes. Also, when the contacts 38 open, the valve 22 closes and the contactors 44 and 45 open. When the contacts 38 again close, there is a brief time delay to permit the contacts 44 and 45 to close before the water is supplied to the generator thereby to prevent the supply of water to the generator before the electrodes are energized.

The purpose of the time delay relay 57 is to provide a time delay of predetermined duration between a demand for water in generator 18 and the actual opening of the water inlet valve 22.

When the generator is empty and the system is initially energized, current simultaneously flows through the solenoids 46 and 47 and the pickup coil of the time delay relay 57 inasmuch as the current relay contacts 54 are closed. Accordingly, the contacts 44 and 45 first close and then the water inlet valve 22 opens. Whether or not the generator would overflow in the time between the opening of valve 22 and the energization of the electrodes if a time delay were not provided depends among other things on the size of the generator, the size of the electrodes and the conductivity of the water.

After the system is in operation, a demand for water is sensed by the current relay 55. When the electrode current rises above the operating current of relay 55, the relay 55 picks up, i.e., the contacts 54 open, and water inlet valve 22 is closed. When the electrode current falls below the operating current of the relay 55, the relay 55 drops out, i.e. the contacts 54 close. This energizes the time delay relay 57 which, after a predetermined time delay, closes the contacts 53 to open the water inlet valve 22. In the absence of this time delay, when the critical current is reached water would almost immediately enter the steam compartment. Since the conductivity of the water would be lower than the preheated water already in the compartment its affect on electrode current would be less than normal and the water inlet valve would remain open for a period in excess of that required to bring the water level to the desired height. If the normal water level is relatively high because, for example, of the low conductivity of the water being used, this excess water can cause an overflow of the generator.

When the temperature in the cooking compartment initially reaches 220° F near the beginning of the cycle, the thermostat switch 35 closes to energize the timer motor 36 and to energize and thus close the cooking compartment drain valve 30. Pressure and temperature then rapidly build up in the compartment to cook the product contained in the pans.

When the cooking period set on the time has been timed out, the timer switch arm 51 moves out of engagement with the contact 52 to de-energize the steam generator and the solenoids of the valves 22, 28 and 30 whereby the water inlet valve 22 closes, and the outlet valve 28 and 30 open to drain both the generator 18 and the cooking compartment 12. At this time the switch arm 51 moves up into engagement with a contact 58 to energize a suitable alarm 59 signifying the end of the cooking cycle.

When the generator drain valve 28 opens, the steam pressure in the generator and in the cooking compartment rapidly forces the water out of the generator and steam flows through the generator over the surface of the electrodes to remove an salts which may have been deposited thereon. Such flushing of the generator after each cooking cycle minimizes the detrimental build up of salts on the electrodes.

An additional advantage obtained by draining the generator at the completion of each cooking cycle is that when a cooking cycle is commenced, steam is initially supplied to the cooking compartment at a relatively low pressure compared to the pressure provided during the overall cooking period. Since better defrosting is achieved with low pressure low temperature steam, a better final product results. In practice a pressure of about 5 psi during the defrosting period and a pressure of 15 psi during the cooking period has provided good results with those types of frozen foods, such as peas, which are easily overcooked.

While the present invention has been described in connection with a particular embodiment thereof, it will be understood that those skilled in the art may make many changes and modifications without departing from the true spirit and scope therof. Accordingly, the appended claims are intended to cover all such changes and modifications as fall within the true spirit and scope of the present invention.

What is claimed is:

1. In an electrolytic steam generator having a steam compartment provided with a water inlet and a steam outlet and a plurality of electrodes disposed in said compartment so as to be immersed in the water in said compartment when said compartment is filled with water to at least a predetermined level, the improvement comprising a control system for controlling the supply of water to said chamber through said inlet and for controlling the supply of current to said electrodes, said control system including normally closed valve means for controlling the supply of water to said inlet, means for selectively operating said valve means, relay means for connecting a source of current to said electrodes, means for selectively energizing said relay means, said valve operating means including means responsive to the magnitude of the current flow between said electrodes, said current flow responsive means allowing said valve means to be opened only when the current flow between the electrodes is below a predetermined value, and said valve operating means further including a time delay means controlled by said current flow responsive means for delaying the opening of said valve means for a predetermined time after said relay means is energized to connect said source of current to said electrodes and the current supplied to said electrodes is less than said predetermined value.

2. In an electrolytic steam generator having a steam compartment provided with a steam outlet, a water inlet and a plurality of electrodes disposed in said compartment so as to be immersed in the water in said compartment when said compartment is filled with water to at least a predetermined level, the improvement comprising a current relay having a pickup coil and a set of normally closed contacts operated by said coil, a normally closed water inlet valve means for controlling the supply of water to said water inlet, said valve means having a solenoid for opening said valve, time delay relay means having a set of normally open contacts and an operating coil for closing said contacts a predetermined time after said time delay means is energized, said normally closed contacts and said normally open contacts being serially connected with said solenoid across a source of voltage, said operating coil being connected in series with said normally closed contacts across a source of voltage, and control means for connecting said pickup coil in series with said electrodes across a source of voltage to cause said pickup coil to open said normally closed contacts when the current supplied to said electrodes exceeds a predetermined value, whereby the opening of said water inlet valve means to supply water to said compartment is delayed for a predetermined time following the time when the current supplied to said electrodes falls below said predetermined value.

3. The improvement in an electrolytic steam generator according to claim 2 wherein said control means includes a relay having a control solenoid, and further comprising switch means connected in series with said solenoid of said control means across a source of voltage, said switch means also being connected in series with said normally open contacts, said normally closed contacts and said solenoid of said valve means, said switch means being responsive to the pressure in said compartment for breaking the connection between said source of voltage and said solenoid of said valve means and for breaking the connection between said source of voltage and said solenoid of said control means.

* * * * *